(12) United States Patent
Lynch et al.

(10) Patent No.: US 11,059,592 B2
(45) Date of Patent: Jul. 13, 2021

(54) COAXIAL FLUID VENT AND ELECTRONIC CONTROL FOR A FLUID VALVE FOR AIRCRAFT

(71) Applicant: Gulfstream Aerospace Corporation, Savannah, GA (US)

(72) Inventors: Kristopher Lynch, Savannah, GA (US); Mike Lucas, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 788 days.

(21) Appl. No.: 15/292,776

(22) Filed: Oct. 13, 2016

(65) Prior Publication Data

US 2018/0105275 A1   Apr. 19, 2018

(51) Int. Cl.
*B64D 13/06* (2006.01)
*B64D 13/00* (2006.01)

(52) U.S. Cl.
CPC ........ *B64D 13/06* (2013.01); *B64D 2013/003* (2013.01); *B64D 2013/0625* (2013.01)

(58) Field of Classification Search
CPC .............. B64D 13/06; B64D 2013/003; B64D 2013/0625; B64H 1/3435; B64H 1/3442
See application file for complete search history.

(56) References Cited

U.S. PATENT DOCUMENTS

| | | |
|---|---|---|
| 23,446 A | 5/1859 | Chambers, Jr. |
| 2,441,088 A | 5/1948 | Teague, Jr. |
| 2,516,805 A | 7/1950 | Rother et al. |
| 2,596,909 A | 5/1952 | Mufich et al. |
| 2,854,913 A | 10/1958 | Brahm |
| 3,436,522 A | 4/1969 | Carkhuff et al. |
| 3,690,244 A | 9/1972 | Kallel et al. |
| 3,736,858 A * | 6/1973 | Mercier ................. B60H 1/345 454/286 |
| 3,952,773 A | 4/1976 | Hahn |
| 4,396,157 A | 8/1983 | Inculet et al. |

(Continued)

FOREIGN PATENT DOCUMENTS

| | | |
|---|---|---|
| DE | 102005017993 A1 | 10/2006 |
| WO | 2013109332 A1 | 7/2013 |

OTHER PUBLICATIONS

International Searching Authority, PCT International Search Report and Written Opinion dated Jun. 28, 2013 in International Application No. PCT/US2012/063222.

(Continued)

*Primary Examiner* — Richard R. Green
(74) *Attorney, Agent, or Firm* — LKGlobal | Lorenz & Kopf, LLP

(57) ABSTRACT

A ventilation system for ventilating a passenger compartment of an aircraft, an aircraft, and a method of operating the ventilation system are disclosed herein. The ventilation system includes, but is not limited to, a bezel, a fluid vent, an electronic sensor, and a valve. The bezel defines a bezel aperture and the fluid vent defines an axis that passes through the bezel aperture to direct a stream of air through the bezel into the passenger compartment. The electronic sensor is associated with the bezel and is configured to generate a bezel position signal. The valve is configured to vary a flow rate of the stream of air through the fluid vent based on the bezel position signal.

7 Claims, 4 Drawing Sheets

(56) References Cited

U.S. PATENT DOCUMENTS

| | | | |
|---|---|---|---|
| 5,099,752 A | 3/1992 | Bosley | |
| 5,338,254 A | 8/1994 | Farrington | |
| 5,695,396 A | 12/1997 | Markwart et al. | |
| 6,619,589 B2 | 9/2003 | Brasseur et al. | |
| 7,538,289 B2 * | 5/2009 | Carroll ................ | B60H 1/3442 |
| | | | 200/277 |
| 8,016,211 B2 | 9/2011 | Barr et al. | |
| 8,795,041 B2 | 8/2014 | Saito et al. | |
| 2007/0074930 A1 | 4/2007 | Tomerlin et al. | |
| 2009/0230212 A1 | 9/2009 | Barr et al. | |
| 2010/0043794 A1 | 2/2010 | Saito et al. | |
| 2010/0093267 A1 | 4/2010 | Hogh et al. | |
| 2010/0240290 A1 | 9/2010 | Markwart et al. | |
| 2011/0240796 A1 | 10/2011 | Schneider | |
| 2012/0067983 A1 | 3/2012 | Czingon | |
| 2012/0186282 A1 | 7/2012 | Army et al. | |
| 2013/0115868 A1 | 5/2013 | Davis et al. | |
| 2015/0210397 A1 | 7/2015 | Blom et al. | |

OTHER PUBLICATIONS

The International Bureau of WIPO, International Preliminary Report on Patentability dated May 15, 2014 for International Application No. PCT/US2012/063222.

State Intellectual Property Office of the Peoples Republic of China, Office Action received for Application No. 201280054124.7 dated Jul. 1, 2015.

German Patent and Trademark Office, Search Report for Application No. 10 2017 123 598.1, dated Jul. 30, 2018.

* cited by examiner

COAXIAL FLUID VENT AND ELECTRONIC CONTROL FOR A FLUID VALVE FOR AIRCRAFT

TECHNICAL FIELD

The present invention generally relates to a ventilation system for an aircraft, and more particularly relates to an electronically adjustable passenger climate control vent with coaxial bezel for flow control.

BACKGROUND

A modern passenger aircraft commonly includes a ventilation system that is configured to direct a stream of cooled (or heated) air towards each passenger onboard the aircraft. Typically, each passenger is presented with an adjustable fluid vent that is mounted in an overhead compartment and which the passenger can manipulate and reposition to control the direction of the stream of air. For example, the fluid vent may be configured as a sphere and may be mounted in a ball socket in the overhead compartment. By moving the spherical fluid vent in the ball socket, the passenger can control the direction of the stream of air.

The fluid vent also includes an integrated valve that the passenger may open and/or close at will. Commonly, the valve is a pintle valve that includes a pintle and an opening that is configured to engage with, and to be obstructed by, the pintle. As the passenger rotates an actuator on the fluid vent clockwise or counter-clockwise, the pintle is retracted and/or extended causing the pintle valve to open and/or close, respectively. When the pintle valve is opened, the stream of air flows out of the fluid vent and when the pintle valve is closed, the stream of air is cut off. Accordingly, the conventional ventilation system described above allows each passenger to turn the stream of air on and off at will and to direct the stream of air towards a desired target. This level of control provides for the comfort of the passengers. This style of adjustable ventilation is commonly referred to as a 'gasper' in aviation applications.

While the above described ventilation system is adequate, there is room for improvement. The movement and the acceleration of the flow of air through the fluid vent causes the emission of an appreciable hissing sound as the stream of air exits the fluid vent. In many applications, the hissing sound made by the ventilation system is not appreciably louder than the background noise in the cabin of an aircraft and is therefore acceptable. However, some aircraft (e.g., privately owned corporate jets) are designed, constructed, and/or configured to provide a reduced level of background noise within the cabin during aircraft operations as compared with conventional commercial aircraft. In such aircraft, the noise generated by the ventilation system may be quite noticeable and/or unacceptable to potential customers.

One solution to quiet the flow of air is to place an electronically actuatable valve upstream of the fluid vent to replace the manual open/close function of the gasper. Such a solution is effective to quiet the flow of air, but does not provide the same operational feedback as a conventional gasper valve. For example, a passenger is able to see how much they have rotated a conventional gasper, but may not have the same level of awareness of how much they have adjusted an electronically controlled valve that is adjusted by use of open/close buttons on a chairside console.

Accordingly, it is desirable to provide a ventilation system that utilizes an electronically actuatable valve and provides passenger feedback and awareness of the commanded position of the valve. Furthermore, other desirable features and characteristics will become apparent from the subsequent detailed description and the appended claims, taken in conjunction with the accompanying drawings and the foregoing technical field and background.

BRIEF SUMMARY

A ventilation system for ventilating a passenger compartment of an aircraft, an aircraft, and a method of operating a ventilation system are disclosed herein.

In a first non-limiting embodiment, the ventilation system includes, but is not limited to, a bezel, a fluid vent, an electronic sensor, and a valve. The bezel defines a bezel aperture and the fluid vent defines an axis that passes through the bezel aperture to direct a stream of air through the bezel into the passenger compartment. The electronic sensor is associated with the bezel and is configured to generate a bezel position signal. The valve is configured to vary a flow rate of the stream of air through the fluid vent based on the bezel position signal.

In another non-limiting embodiment, an aircraft includes, but is not limited to, a passenger seat, an overhead compartment disposed above the seat, a ventilation system, and a control system. The control system is disposed in the overhead compartment and includes a bezel and an electronic sensor. The bezel defines a bezel aperture and the electronic sensor is associated with the bezel and is configured to generate a bezel position signal. The ventilation system is disposed in the overhead compartment and includes a fluid vent and a valve. The fluid vent defines an axis that passes through the bezel aperture to direct a stream of air through the bezel and the valve is configured to vary a flow rate of the stream of air through the fluid vent based on the bezel position signal.

The ventilation system is disposed in the overhead compartment and includes a fluid vent and a valve. The fluid vent defines an axis that passes through the bezel aperture to direct a stream of air through the bezel into the passenger compartment. The valve is configured to vary a flow rate of the stream of air through the fluid vent. The control system is associated with the ventilation system and includes a bezel and an electronic sensor. The bezel defines a bezel aperture and the electronic sensor is associated with the bezel and is configured to generate a bezel position signal that causes the valve to vary the flow rate of the stream of air.

In another non-limiting embodiment, a method of operating an electronically actuatable valve for a fluid vent in an overhead compartment of an aircraft includes, but is not limited to, detecting an angular position of a bezel through which a flow of air is directed by a ventilation system. The method further includes commanding the electronically actuatable valve to adjust the flow of air in response to an angular rotation of the bezel.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved ventilation system is disclosed herein. As compared with conventional ventilation systems, the ventilation system of the present disclosure utilizes an electronically actuatable valve that opens and closes in response to rotation of a bezel by a passenger. The bezel is coaxial with a fluid vent of the ventilation system to provide an appearance and user controls similar to those of a conventional manually controlled gasper. A greater understanding of the ventilation system described above may be obtained through a review of the illustrations accompanying this application together with a review of the detailed description that follows.

Figure 1:
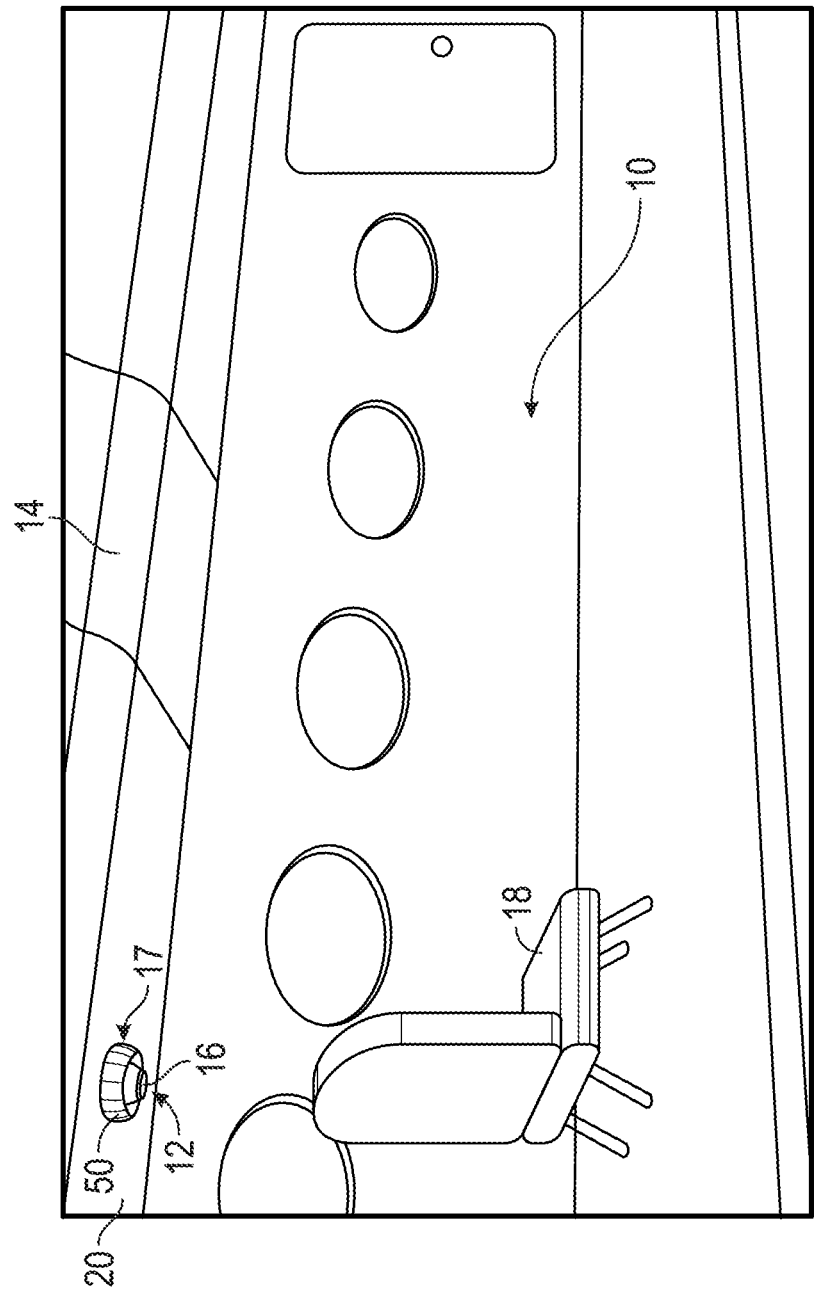
FIG. 1 is an environmental view illustrating an interior of a cabin compartment of an aircraft that includes an embodiment of a ventilation system made in accordance with the teachings of the present disclosure.

FIG. 1 is an environmental view illustrating an interior portion of a cabin compartment 10 of a privately owned business jet. Although the context of the discussion contained herein is with respect to a privately owned business jet, it should be understood that the teachings of the present disclosure are compatible with all types of aircraft including, but not limited to, private propeller driven aircraft, private jets, commercial jet passenger aircraft, commercial propeller driven passenger aircraft, cargo aircraft, military aircraft, and the like. Furthermore, although the ventilation system disclosed herein is described as being compatible for use on board an aircraft, it should be understood that the present ventilation system is compatible with all types of vehicles. For example, and without limitation, the ventilation system disclosed herein may be implemented on board automobiles, buses, trains, ships, spacecraft, and any other type of conveyance. Additionally, the ventilation system disclosed herein is not limited to implementation on vehicles, but may also be compatible for use in tents, houses, buildings, stadiums, theaters, and other permanent and/or semi-permanent structures.

Cabin compartment 10 includes an embodiment of a ventilation system 12 made in accordance with the teachings of the present disclosure. In the illustrated embodiment, ventilation system 12 is housed in an overhead compartment 14 which is configured to house ventilation system 12 as well as other equipment needed to support ventilation system 12 and to support operation of the aircraft. Ventilation system 12 includes a fluid vent 16 and a control system 17.

Fluid vent 16 has a ball-in-socket type of arrangement with a fluid vent mount (not shown in FIG. 1) that permits a passenger to manipulate fluid vent 16 and, in turn, to direct the stream of air emitted by ventilation system 12 towards a desired area. In the example provided, fluid vent 16 has a fixed cross-sectional area that is not adjustable by the passenger. In some embodiments, fluid vent 16 may have an adjustable cross-sectional area that is adjusted by control system 17.

A passenger seat 18 is positioned below ventilation system 12 and is configured to receive a passenger of the aircraft. In the illustrated embodiment, a single ventilation system 12 is devoted to cooling and/or heating the passenger of a single passenger seat 18. In other embodiments, multiple ventilation systems 12 may be configured to direct streams of air towards a single passenger seat 18. In still other embodiments, a single ventilation system 12 may be configured to provide multiple streams of air to multiple passenger seats 18.

Figure 2:
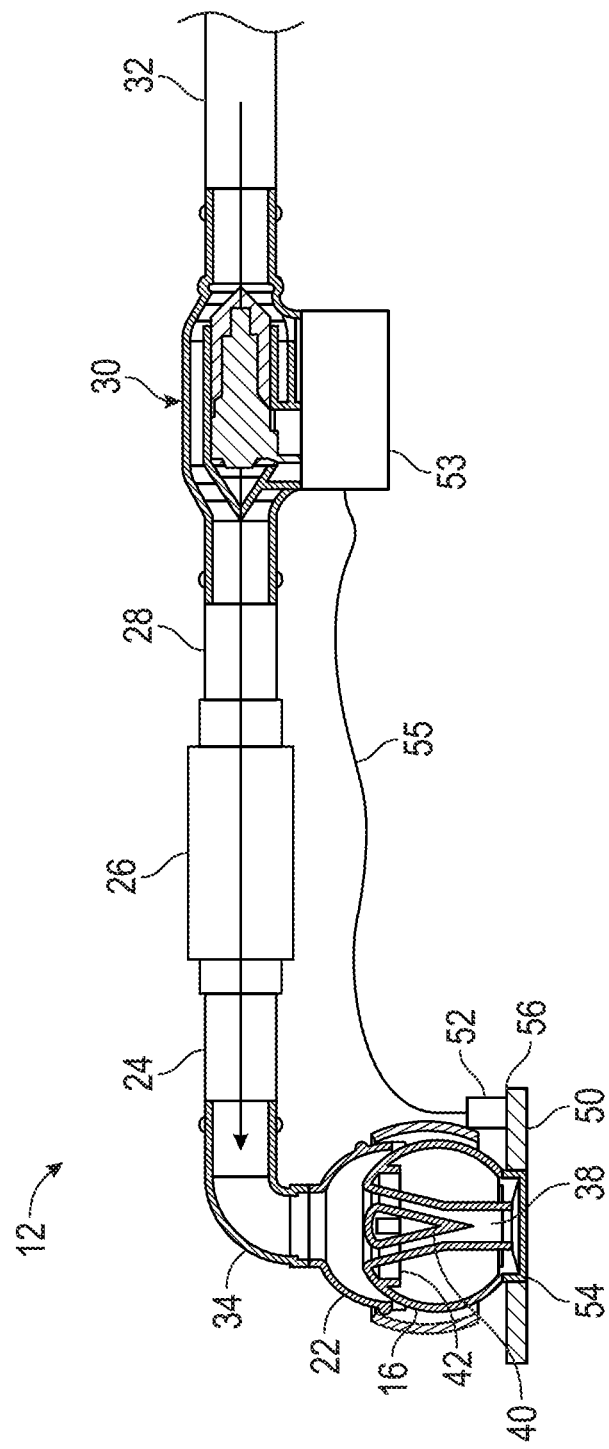
FIG. 2 is a perspective view illustrating an interior portion of an overhead cabinet housing of an embodiment of the ventilation system of the present disclosure.

With continuing reference to FIG. 1, FIG. 2 is a perspective view illustrating an interior portion of overhead compartment 14. Ventilation system 12 is mounted to a bottom panel 20 of overhead compartment 14. Ventilation system 12 includes a fluid vent 16, a fluid vent mount 22, a hose segment 24, a muffler 26, a hose segment 28, an electronically actuatable valve 30.

As illustrated, fluid vent 16 has a generally spherical configuration which allows fluid vent 16 to be swiveled about at least two axes with respect to fluid vent mount 22. This provides a passenger in a cabin compartment 10 great freedom and flexibility in selecting a direction for the stream of air emitted by fluid vent 16. The internal components of fluid vent 16 are also depicted. For example, fluid vent 16 includes a pathway 38 configured to guide and accelerate the flow of air passing through ventilation system 12 to form the relatively high-speed stream of air emitted by fluid vent 16. Fluid vent 16 is also fitted with a pintle 40 that is positioned at an upstream portion of pathway 38. Pintle 40 is substantially axisymmetric and contoured to have the general profile of an airfoil. Pintle 40 is held in place in pathway 38 via a plurality of tab members 42. It should be appreciated that the configuration of fluid vent 16 may vary without departing from the scope of the present disclosure.

Fluid vent mount 22 and fluid vent 16 are coupled to one another in a ball-in-socket arrangement and, accordingly, fluid vent 16 is able to swivel with respect to fluid vent mount 22 about both an X axis and a Y axis. Accordingly, a passenger seated below fluid vent 16 can reach up and, at will, direct a stream of air emitted by fluid vent 16 towards a desired area. Fluid vent mount 22 may include one or more openings to receive a fastener that can be used to secure fluid vent mount 22 to bottom panel 20.

Extending out of a rear portion of fluid vent mount 22 is a tube segment 34. Tube segment 34 is curved to direct the flow of air from hose segment 24 into fluid vent mount 22. Fluid vent mount 22, fluid vent 16, and tube segment 34 may be constructed from any suitable material including, but not limited to, plastics, metals, polymeric materials, and any other suitable material that is effective to contain a flow of air as it passes through each respective component.

Hose segment 24 and hose segment 28 may comprise any type of conventional hosing that is effective to contain and direct a flow of air. Hose segment 24 and hose segment 28 may be constructed of any suitable material including, but not limited to, rubbers, plastics, and polymeric materials. In other embodiments, hose segment 24 and hose segment 28 may not comprise a hose segment, but rather, may comprise a tube segment or other type of conduit that is configured to contain and direct a flow of air. Accordingly, in some embodiments, hose segment 24 and hose segment 28 may be comprised of materials, such as rubber, that render hose segment 24 and hose segment 28 substantially flexible while in other embodiments, hose segment 24 and hose segment 28 may be comprised of metal which render hose segment 24 and hose segment 28 substantially rigid. In the illustrated embodiment, hose segment 24 is connected at one end to tube segment 34 and is connected at an opposite end to muffler 26.

Muffler 26 is configured as a straight-through muffler. Accordingly, muffler 26 does not include baffles or other obstructions typically found in mufflers. Rather, muffler 26 has a substantially hollow interior that may be dimensioned, contoured, and constructed of materials that are configured to reduce the volume of the undesired sound generated by the flow of air through electronically actuatable valve 30. Such sound-reducing techniques, designs, and configurations are well known to those of ordinary skill in the art. As discussed above, one end of muffler 26 is connected to hose segment 24. The opposite end of muffler 26 is connected to hose segment 28. In some embodiments, muffler 26 is omitted.

Electronically actuatable valve 30 may comprise any type of valve that is effective to control (i.e., selectively permit and inhibit) the flow of air. For example, in some embodiments, electronically actuatable valve 30 may comprise a poppet valve or a flapper valve. Electronically actuatable valve 30 includes electronic components that are well known in the art and that permit electronically actuatable valve 30 to be actuated electronically and/or remotely. In the example provided, electronically actuatable valve 30 includes an actuator, such as a solenoid. Configured in this manner, the flow of air through ventilation system 12 can be selectively stopped and started remotely by a passenger or other user by use of control system 17.

In the illustrated embodiment, electronically actuatable valve 30 is secured by a plurality of threaded fasteners (not illustrated) to bottom panel 20. A downstream portion of electronically actuatable valve 30 is connected to hose segment 28 while an upstream portion of electronically actuatable valve 30 is connected to a hose 32 that is configured to supply pressurized air. Accordingly, when electronically actuatable valve 30 is opened, a pressure difference between the air on the downstream side of electronically actuatable valve 30 (low pressure) and the air on the upstream side of electronically actuatable valve 30 (high pressure) causes the air to flow downstream through electronically actuatable valve 30.

As illustrated in FIG. 2, the pressurized air supplied by hose 32 will travel through electronically actuatable valve 30, through hose segment 28, through muffler 26, through hose segment 24, through fluid vent mount 22, and through fluid vent 16 before entering cabin compartment 10. Electronically actuatable valve 30 has been spaced apart from fluid vent 16 by hose segment 24, muffler 26, and hose segment 28. Arranged in this manner, any undesired sound generated by the flow of air supplied by hose 32 as it passes over the internal components of electronically actuatable valve 30 will have ample opportunity to dissipate before entering cabin compartment 10. Additionally, as discussed above, muffler 26 is designed and configured to further suppress the transmission of undesired sound through ventilation system 12 into cabin compartment 10. Accordingly, when the flow of air passing through ventilation system 12 is emitted at fluid vent 16 as a relatively high-speed stream of air, such emissions will be relatively quiet as compared with the stream of air emitted by conventional ventilation systems. In other embodiments, ventilation system 12 may not include muffler 26. In such systems, the spacing apart of fluid vent 16 from electronically actuatable valve 30 will, by itself, substantially reduce the volume of undesired noise emitted from fluid vent 16. In such systems, any amount of distance between fluid vent 16 and electronically actuatable valve 30 may be sufficient to quiet the system or to at least reduce the noise caused by operation of the system.

It should be appreciated that the location of electronically actuatable valve 30 in the fluid path may be adjusted without departing from the scope of the present disclosure. For example, electronically actuatable valve 30 may be disposed within fluid vent 16 or at an upstream manifold in some embodiments.

Control system 17 includes a bezel 50, a bezel sensor 52, and a valve controller 53. Bezel 50 defines a bezel aperture 54 in which fluid vent 16 is at least partially disposed. In the example provided, fluid vent 16 is coaxial with bezel aperture 54. For example, fluid vent 16 is centered within a substantially annular inside wall of bezel 50 that defines bezel aperture 54. As used herein, the term "coaxial with" refers to axes defined by the respective components in the centered positions. For example, although fluid vent 16 may be rotated and adjusted to direct a flow of air to a passenger, fluid vent 16 is still coaxial with bezel 50 when fluid vent is secured in fluid vent mount 22 such that fluid vent 16 is coaxial with bezel aperture 54 when fluid vent 16 is centered in fluid vent mount 22. In some embodiments, bezel 50 is secured to fluid vent mount 22 such that bezel 50 remains coaxial with fluid vent 16 for all adjustment positions of fluid vent 16. In some embodiments, bezel 50 and the extension of fluid vent 16 that defines bezel aperture 54 are structurally combined into a single piece that is embedded into fluid vent 16 or fluid vent mount 22.

In the example provided, fluid vent 16 and bezel 50 are annular in shape and are coaxial with respect to the outer surfaces of fluid vent 16 and bezel 50. For example, an outer surface of fluid vent 16 may be semi-spherical and bezel 50 may have a substantially cylindrical outer surface 56 that is coaxial with fluid vent 16. It should be appreciated that fluid vent 16 and bezel 50 may have other shapes without departing from the scope of the present disclosure.

Bezel sensor 52 is an electronic sensor associated with bezel 50 and configured to generate a bezel position signal on a communication bus 55. Bezel position signal is configured to convey information or commands that may be used by electronic valve controller 53 to adjust the position of electronically actuatable valve 30 and the volume of air flowing through fluid vent 16. Accordingly, electronically actuatable valve 30 is configured to vary a flow rate of the stream of air through fluid vent 16 based on the bezel position signal to provide rotational control similar to that of a conventional manual gasper valve. In some embodiments, bezel position signal indicates a rotational position of bezel 50. In some embodiments, bezel position signal indicates that a switch has been closed or opened in response to rotation of bezel 50 to a predetermined switch closure position. In some embodiments, the functions of bezel sensor 52 and valve controller 53 may be combined in a single device.

In the example provided, communication bus 55 is an electrically conductive cable that transmits the bezel position signal from bezel sensor 52 directly to valve controller 53. In some embodiments, communication bus 55 may be part of a vehicle communication bus. In some embodiments, communication bus 55 may be a wireless network.

Figure 3:
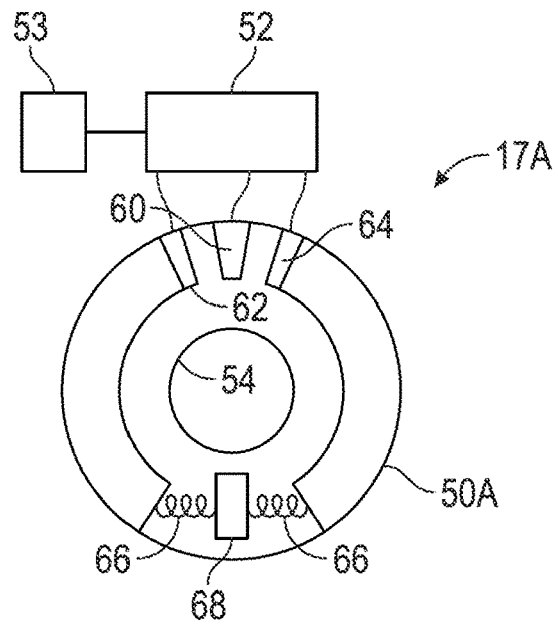
FIGS. 3, 4, and 5 are simplified schematic views illustrating embodiments of a control system for the ventilation system of FIG. 2.

With continuing reference to FIG. 2, FIG. 3 is a schematic view illustrating an interior portion of a bezel 50A used in a control system 17A. Control system 17A is similar to control system 17, where like numbers refer to like components. Control system 17A, however, includes bezel 50A. In the example provided, bezel sensor 52 is a switch configured to command electronically actuatable valve 30 to vary the flow rate of the stream of air in response to closure of the switch by rotation of bezel 50A.

Bezel 50A includes a rotationally fixed first contact 60, a second contact 62, a third contact 64, and a tactile feedback system that includes biasing members 66. Second and third contacts 62 and 64 are coupled for common rotation with bezel 50A. First contact 60 is positioned to touch second contact 62 when bezel 50A is rotated clockwise by a predetermined amount, and is positioned to touch third contact 64 when bezel 50A is rotated counterclockwise by a predetermined amount. First contact 60 closes a first switch circuit when second contact 62 touches first contact 60 and closes a second switch circuit when third contact 64 touches first contact 60. In the embodiment provided, valve controller 53 is configured to close electronically actuatable valve 30 to reduce the volume of air flowing through fluid vent 16 in response to closure of first switch circuit. Conversely, valve controller 53 is configured to open electronically actuatable valve 30 to increase the volume of air flowing through fluid vent 16 in response to closure of second switch circuit. Accordingly, rotation of bezel 50A by a passenger may be used to increase and decrease air flow through fluid vent 16. It should be appreciated that the direction of rotation to open and close electronically actuatable valve 30 may be different from the directions described without departing from the scope of the present disclosure.

Biasing members 66 are disposed between bezel 50A and a fixed, non-rotational member 68. Biasing members 66 bias bezel 50A towards a center position between second and third contacts 62 and 64 to return bezel 50A to a neutral position when not in use by a passenger.

Figure 4:
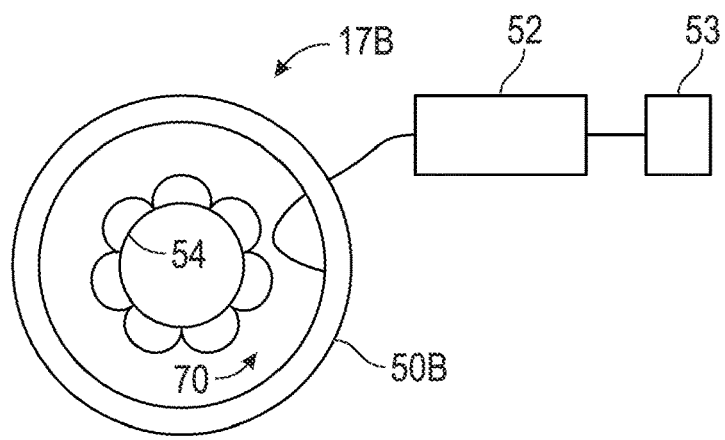

With continuing reference to FIG. 2, FIG. 4 is a schematic view illustrating an interior portion of a bezel 50B used in a control system 17B. Control system 17B is similar to control system 17, where like numbers refer to like components. Control system 17B, however, includes bezel 50B with a tactile feedback system configured to provide tactile feedback to a user during rotation of the bezel. In the example provided, the tactile feedback system is a detent system 70 with a plurality of detents configured to provide rotation resistance when rotating the bezel between a plurality of discrete resting positions. Bezel sensor 52 of control system 17B is an angular sensor configured to detect an angular position of bezel 50B.

Figure 5:
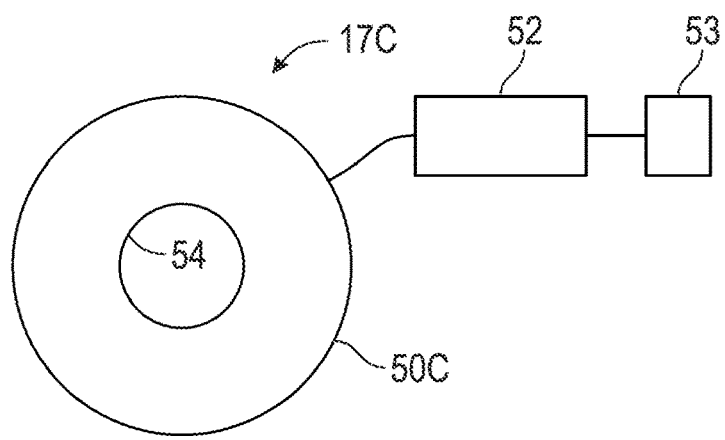

With continuing reference to FIG. 2, FIG. 5 is a schematic view illustrating an interior portion of a bezel 50C used in a control system 17C. Control system 17C is similar to control system 17, where like numbers refer to like components. Control system 17C, however, includes bezel 50C with a tactile feedback system. In the example provided, the tactile feedback system is a friction fitting between the bezel 50C and the fluid vent 16. It should be appreciated that the sensor types and tactile feedback systems of FIG. 3, FIG. 4, and FIG. 5 may be used in any combination without departing from the scope of the present disclosure.

Figure 6:
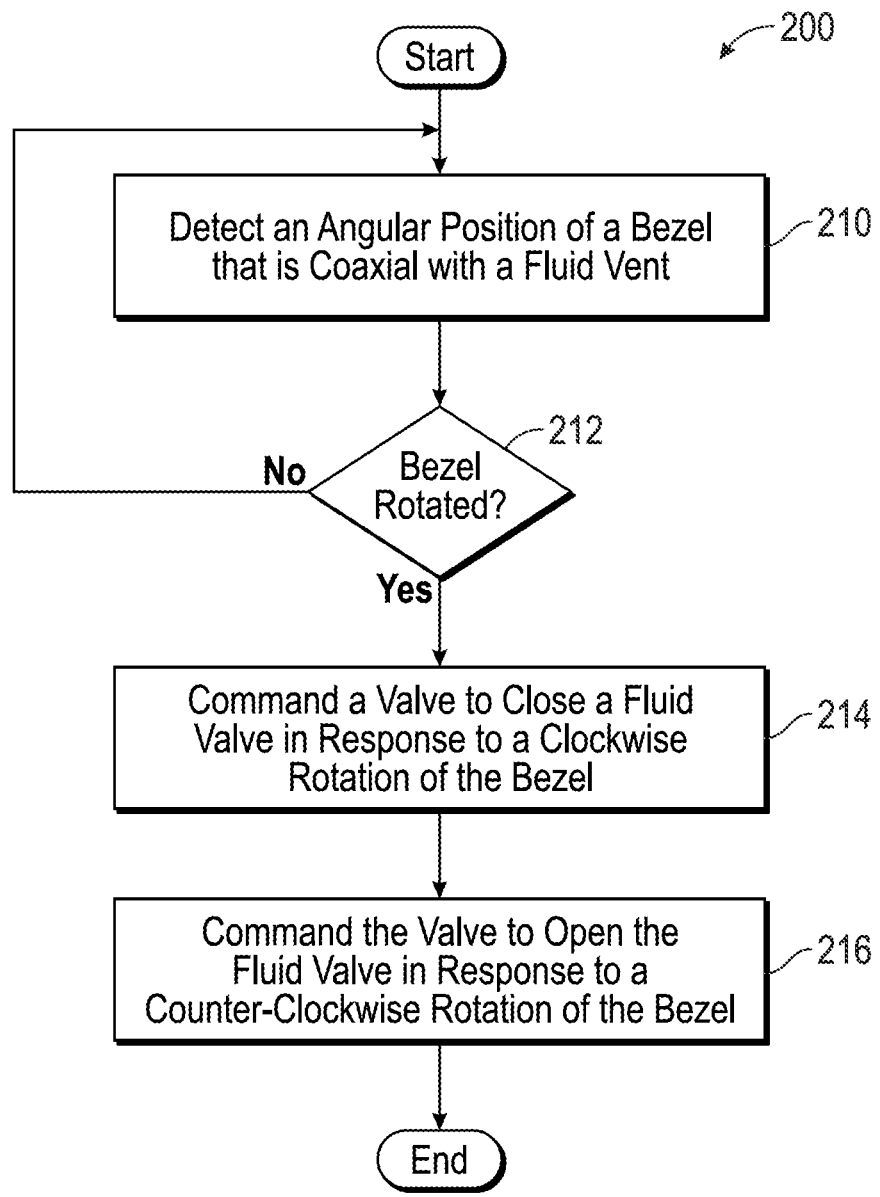
FIG. 6 is a simplified flow diagram illustrating an embodiment of a method for operating the ventilation system of FIG. 2.

With continuing reference to FIGS. 1-2, FIG. 6 is a flow diagram illustrating a method 200 of operating a fluid valve for a ventilation system of an aircraft. In the example provided, method 200 is performed by control system 17. In some embodiments, other systems may perform the operations of method 200.

In operation 210, a sensor detects an angular position of a bezel that is coaxial with a fluid vent. For example, bezel sensor 52 may detect the angular position of bezel 50. Operation 212 determines whether the bezel has been rotated. For example, bezel position signal may indicate whether bezel 50 has been rotated.

In operation 214, a controller commands a valve to close a fluid valve in response to a clockwise rotation of the bezel. For example, valve controller 53 may command electronically actuatable valve 30 to close in response to a clockwise rotation of bezel 50 as indicated by the bezel position signal. In operation 216, the controller commands the valve to open the fluid valve in response to a counterclockwise rotation of the bezel. For example, valve controller 53 may command electronically actuatable valve 30 to open in response to a counter-clockwise rotation of bezel 50 as indicated by the bezel position signal.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A ventilation system for ventilating a passenger compartment of an aircraft, the ventilation system comprising:
   a bezel defining a bezel aperture;
   a fluid vent defining an axis that passes through the bezel aperture to direct a stream of air through the bezel into the passenger compartment;
   an electronic sensor associated with the bezel and configured to generate a bezel position signal, wherein the electronic sensor is a switch having a first contact, a second contact, and a third contact, the position signal indicating whether the first contact has touched the second contact or the third contact; and
   a valve configured to increase a flow rate of the stream of air through the fluid vent in response to the first contact touching the second contact and the valve further configured to decrease the flow rate in response to the first contact touching the third contact as indicated by the bezel position signal wherein the bezel is rotatable to interact with the electronic sensor to command the valve.

2. The ventilation system of claim 1, further comprising an actuator configured to adjust a position of the valve in response to a rotation of the bezel as indicated by the bezel position signal.

3. The ventilation system of claim 1, wherein the fluid vent is at least partially disposed in the bezel aperture.

4. The ventilation system of claim 1, wherein the fluid vent is coaxial with the bezel aperture.

5. The ventilation system of claim 1, wherein the fluid vent is an annular fluid vent, the bezel is an annular bezel, and the annular fluid vent and the annular bezel are coaxial.

6. The ventilation system of claim 1, further comprising a biasing element biasing the bezel to a neutral position in which the switch is open with the first contact not touching the second contact and not touching the third contact.

7. The ventilation system of claim 1, wherein the valve is spaced apart from the fluid vent and positioned upstream of the fluid vent.

* * * * *